United States Patent
Singh et al.

(10) Patent No.: US 11,010,221 B2
(45) Date of Patent: May 18, 2021

(54) DYNAMIC DISTRIBUTION OF MEMORY FOR VIRTUAL MACHINE SYSTEMS

(71) Applicant: Dell Products L.P., Round Rock, TX (US)

(72) Inventors: Ankit Singh, Bangalore (IN); Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 16/373,389

(22) Filed: Apr. 2, 2019

(65) Prior Publication Data

US 2020/0319948 A1  Oct. 8, 2020

(51) Int. Cl.
 *G06F 11/07* (2006.01)
 *G06F 9/455* (2018.01)

(52) U.S. Cl.
 CPC ........ *G06F 11/073* (2013.01); *G06F 9/45558* (2013.01); *G06F 2009/45583* (2013.01); *G06F 2009/45595* (2013.01)

(58) Field of Classification Search
 CPC .............. G06F 11/073; G06F 11/0751; G06F 11/0772; G06F 11/07; G06F 11/2017; G06F 11/2043; G06F 11/0712; G06F 9/45558; G06F 9/45583; G06F 11/0793; G06F 11/1484; G06F 11/142
 See application file for complete search history.

(56) References Cited

U.S. PATENT DOCUMENTS

| | | | | |
|---|---|---|---|---|
| 2013/0097358 A1* | 4/2013 | Li | ........................ | G06F 9/45558 711/6 |
| 2014/0089725 A1* | 3/2014 | Ackaret | .............. | G06F 11/1482 714/6.1 |
| 2014/0281694 A1* | 9/2014 | Gotsubo | ............. | G06F 11/0775 714/6.32 |
| 2015/0067284 A1* | 3/2015 | Antony | ................... | G06F 3/065 711/162 |
| 2017/0147227 A1* | 5/2017 | Stabrawa | .............. | G06F 3/0631 |
| 2017/0364287 A1* | 12/2017 | Antony | ............... | G06F 11/0727 |

* cited by examiner

Primary Examiner — Yolanda L Wilson
(74) Attorney, Agent, or Firm — Baker Botts L.L.P.

(57) ABSTRACT

Dynamic distribution of memory, including identifying memory modules; creating a system physical address (SPA) of the memory modules; assigning, for each virtual machine (VM), a respective section of the SPA to the VM; calculating, for each VM, portions of the respective section of the SPA for the VM that is being used by the VM and that is not being used by the VM; identifying a physical failure of a particular memory module; in response to identifying the physical failure: identifying a particular VM assigned to the section of the SPA associated with the particular memory module that has physically failed; accumulating, for each other VM, the unused portions of the respective SPA for the VM; marking, for each other VM, the unused portion of the SPA for the VM as read-only for the VM; and reassigning a portion of the unused portions of the SPA to the particular VM.

20 Claims, 3 Drawing Sheets

DYNAMIC DISTRIBUTION OF MEMORY FOR VIRTUAL MACHINE SYSTEMS

BACKGROUND

Field of the Disclosure

The disclosure relates generally to information handling systems, and in particular, dynamic distribution of memory in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Whenever there is a failure of memory modules of an information handling system, any virtual machines of the system may have to shut down in order to replace the failed memory module. Specifically, once virtual machines are installed by a hypervisor, the hypervisor can assign system physical addresses to the virtual machines before the system is started or booted. However, in case of a memory module failure, all virtual machines are brought down and can be restarted only after the replacement/rectification of the faulty memory module.

SUMMARY

Innovative aspects of the subject matter described in this specification may be embodied in a computer-implemented method for dynamic distribution of memory in an information handling system, the method including identifying a plurality of memory modules of the information handling system; creating a system physical address (SPA) of the memory modules; assigning, for each of a plurality of virtual machines (VMs), a respective section of the SPA to the VM; calculating, for each VM, i) a portion of the respective section of the SPA for the VM that is being used by the VM and ii) a portion of the respective section of the SPA for the VM that is not being used by the VM; identifying a physical failure of a particular memory module of the plurality of memory module; in response to identifying the physical failure of the particular memory module: identifying a particular VM of the plurality of VMs assigned to the section of the SPA associated with the particular memory module that has physically failed; accumulating, for each other VM of the plurality of VMs, the unused portions of the respective SPA for the VM; marking, for each other VM of the plurality of VMs, the unused portion of the SPA for the VM as read-only for the VM; and reassigning at least a portion of the unused portions of the SPA to the particular VM.

Other embodiments of these aspects include corresponding system, apparatus, and computer programs, configured to perform the actions of the methods, encoded on computer storage devices.

These and other embodiments may each optionally include one or more of the following features. For instance, rebooting the particular VM after reassigning the at least portion of the unused portion of the SPA to the particular VM. For each VM, the used portion of the respective section of the SPA for the VM includes i) a portion of the respective section of the SPA for the VM that is being actively used and ii) a portion of the respective section of the SPA that is allocated for future use. For each VM, the portion of the respective section of the SPA that is allocated for future use is based on historical usage trend data for the VM. For each VM, the portion of the respective section of the SPA that is allocated for future use is based on a percentage of the portion of the respective section of the SPA for the VM that is being actively used. In response to identifying the physical failure of the particular memory module, maintaining a current operating condition of the remaining VMs of the plurality of VMs. The plurality of memory modules includes non-volatile dual in-line memory modules.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
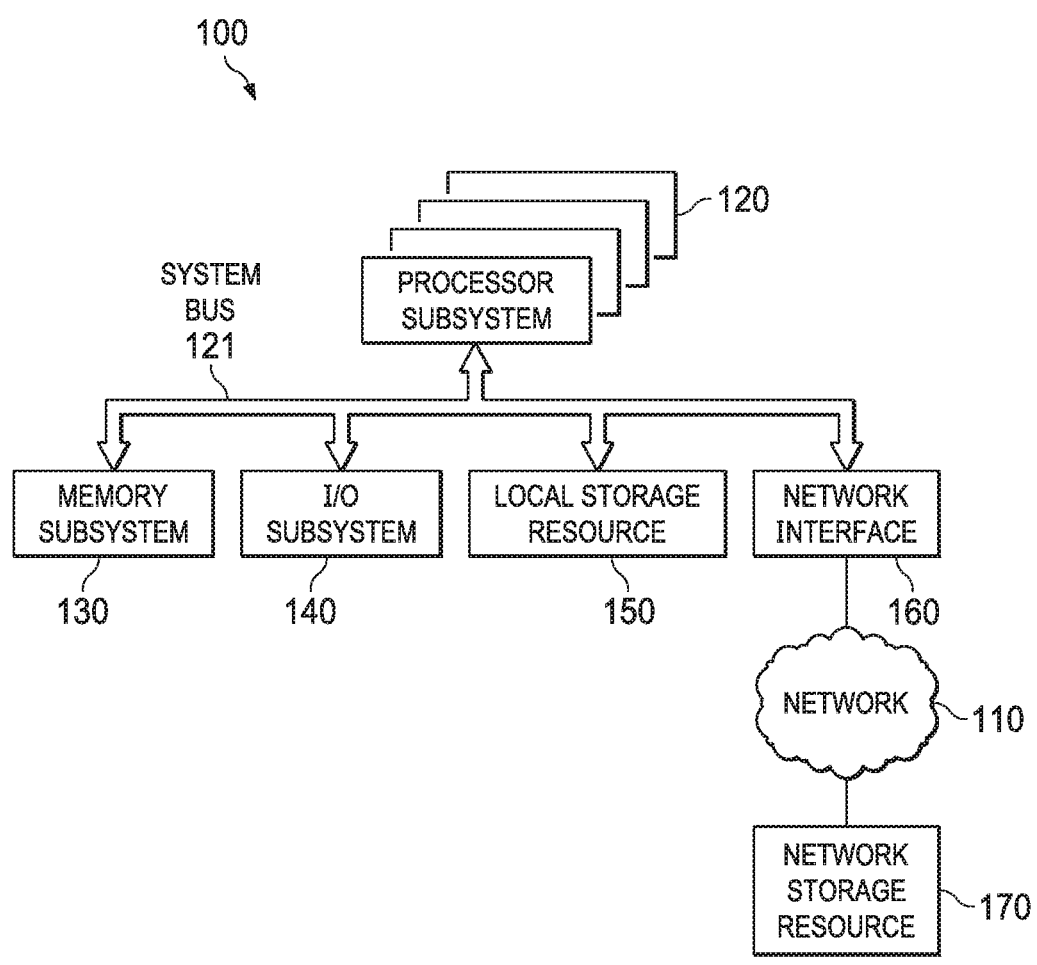
FIG. 1 is a block diagram of selected elements of an embodiment of an information handling system.

This document describes sharing of a system physical address to virtual machines through a hypervisor that can be dynamically re-adjusted or re-calibrated when a failure of a memory module occurs without shutting down the properly functionally other virtual machines. Specifically, the system can calculate unused memory of the virtual machines, and re-assign such to the virtual machine that is assigned to the faulty memory modules. As a result, i) dynamic re-adjustment of memory module space for virtual machines is afforded in case of physical failures of the memory module; ii) re-adjustment of the memory space is allowed without shutting down working virtual machines; iii) a memory management module of a hypervisor can track used and unused memory module space by the virtual machines; and iv) the unused memory module apace will be re-calibrated and automatically assigned to the virtual machine that was brought down due to the memory module failure.

Specifically, this document describes dynamic distribution of memory in an information handling system, including identifying a plurality of memory modules of the information handling system; creating a system physical address (SPA) of the memory modules; assigning, for each of a plurality of virtual machines (VMs), a respective section of the SPA to the VM; calculating, for each VM, i) a portion of the respective section of the SPA for the VM that is being used by the VM and ii) a portion of the respective section of the SPA for the VM that is not being used by the VM; identifying a physical failure of a particular memory module of the plurality of memory module; in response to identifying the physical failure of the particular memory module: identifying a particular VM of the plurality of VMs assigned to the section of the SPA associated with the particular memory module that has physically failed; accumulating, for each other VM of the plurality of VMs, the unused portions of the respective SPA for the VM; marking, for each other VM of the plurality of VMs, the unused portion of the SPA for the VM as read-only for the VM; and reassigning at least a portion of the unused portions of the SPA to the particular VM.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
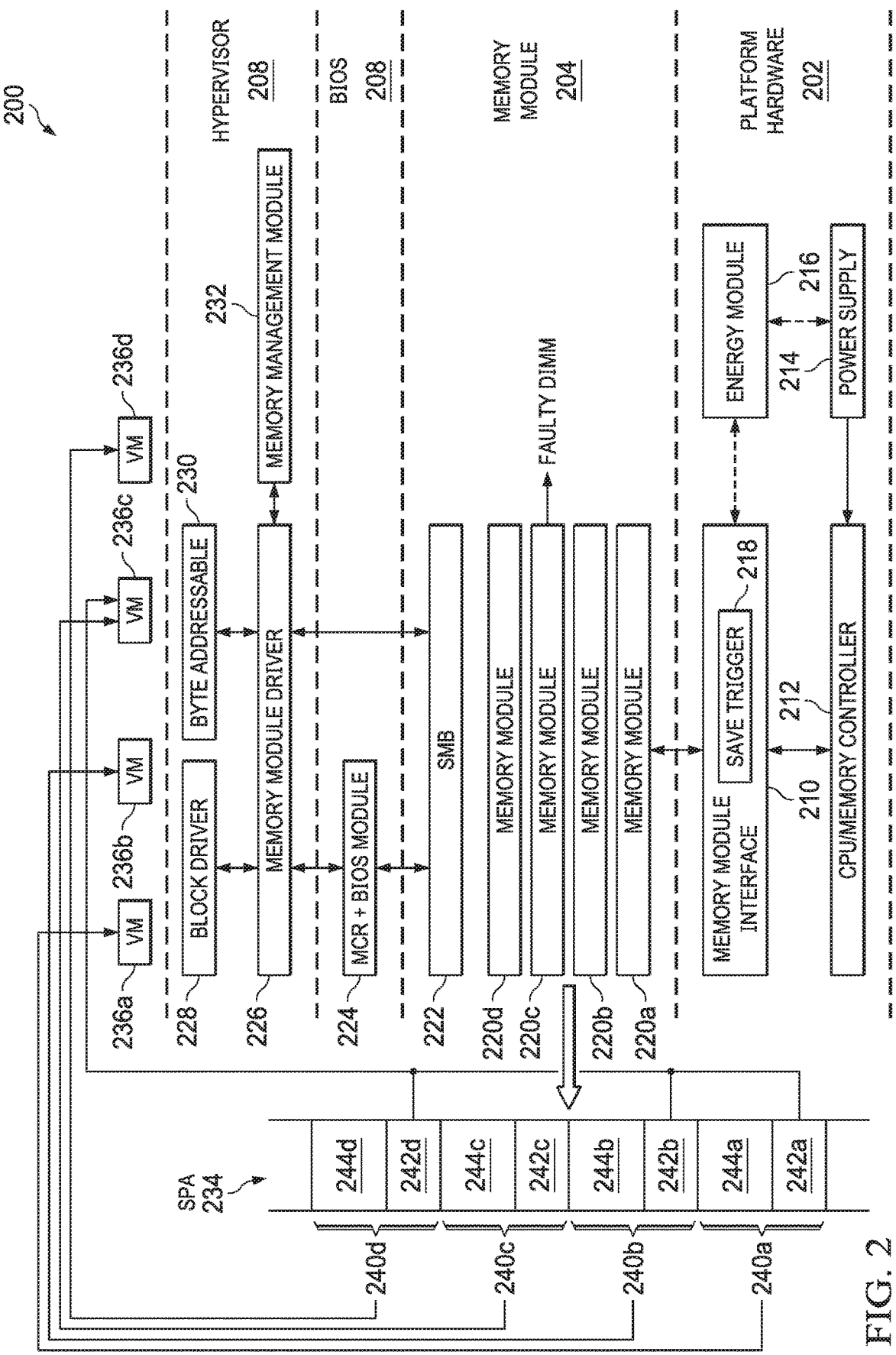
FIG. 2 illustrates a computing environment for dynamic distribution of memory in an information handling system.
Figure 3:
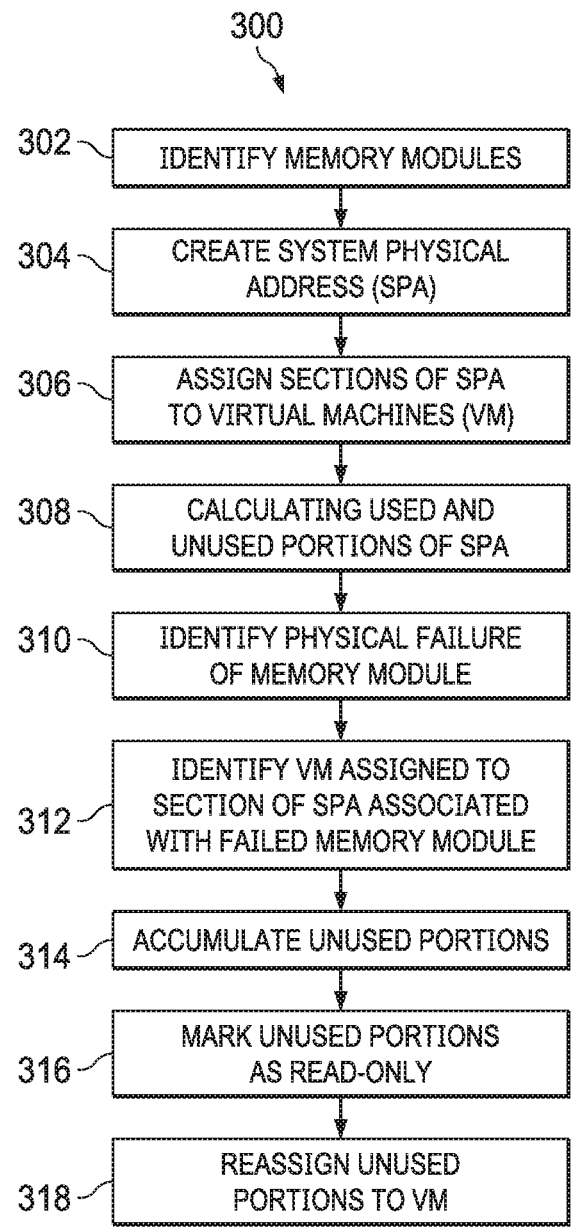
FIG. 3 illustrates a method for dynamic distribution of memory in an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 illustrates a computing environment 200 for dynamic distribution of memory in an information handling system. Specifically, the computing environment 200 includes a platform hardware layer 202, a memory module layer 204, a basic input/output system (BIOS) layer 206, and a hypervisor layer 208. The platform hardware layer 202 can include a memory module interface 210, a CPU/memory controller 212, a power supply 214 and an energy module 216. The memory module interface 210 can include a SAVE trigger module 218. The memory module layer 204 can include memory modules 220*a*, 220*b*, 220*c*, 220*d* (collectively referred to as memory modules 220); however, the memory module layer 204 can include any number of memory modules 220 depending on the application desired. The memory module layer can further include a scalable memory buffer (SMB) 222. The BIOS layer 206 can include a memory reference code (MCR)+BIOS module 224. The hypervisor layer 208 can include a memory module driver 226, a BLOCK driver module 228, a byte addressable module 230, and a memory management module 232. The computing environment 200 can further include a system physical address portion (SPA) 234, and virtual machines (VMs) 236*a*, 236*b*, 236*c*, 236*d* (collectively referred to as VMs 236); however, the environment 200 can include any number of VMs 236. The computing environment 200 can be similar to the information handling system 100, or a portion thereof, of FIG. 1. In some examples, the memory management module 232 can be in communication with the SPA 234.

In some implementations, the memory management module 232 can identify the memory modules 220. The memory modules 220 can include non-volatile dual in-line memory modules (NVDIMM). However, the memory modules 220 can include other types of memory modules depending on the application desired. The memory management module 232 can create the SPA 234 of the memory modules 220. In other words, each of the memory modules 220 are combined by the memory management module 232 to a single address space—the SPA 234. The SPA 234 can be divided to the VMs 236, explained further herein. In some examples, the memory modules 220 can be mapped to one or more portions of the SPA 234. In some examples, the memory modules 220 can be mapped to overlapping portions of the SPA 234. In some examples, the memory modules 220 can be mapped to discrete portions of the SPA 234.

The memory management module 232 can assign, for each of the VMs 236, a respective section of the SPA 234 to the VM 236. In other words, the memory management module 232 can apply logical division to the SPA 234 to assign a respective section to each of the VMs 236. In the illustrated example, the VM 236*a* can be assigned to a first section 240*a* of the SPA 234; the VM 236*b* can be assigned to a second section 240*b* of the SPA 234; the VM 236*c* can be assigned to a third section 240*c* of the SPA 234; and the VM 236*d* can be assigned to the fourth section 240*d* of the SPA 234.

In some examples, a single memory module 220 can be associated with a single VM 236; that is, a single memory module 220 can be mapped to a portion of the SPA 234 that is also mapped to a single VM 236. In some examples, a single memory module 220 can be associated with multiple VMs 236; that is, a single memory module 220 can be mapped to a portion of the SPA 234 that is also mapped to multiple VMs 236. In some examples, multiple memory modules 220 can be mapped to a portion of the SPA 234 that is also mapped to a single VM 236.

In some implementations, the memory management module 232 can calculate, for each VM 236, i) a portion of the respective section of the SPA 234 for the VM 236 that is being used by the VM 236; and ii) a portion of the respective section of the SPA 234 for VM 236 that is not being used by the VM 236. In other words, the memory management module 232 can track the usage of the SPA 234 by each of the VMs 236—e.g., the used and the unused space of the SPA 234. That is, portions of the SPA 234 that are being used by the respective VMs 236.

In the illustrated example, the first section 240a mapped to the VM 236a can include a used portion 242a and an unused portion 244a; the second section 240b mapped to the VM 236b can include a used portion 242b and an unused portion 244b; the VM 236c can include a used portion 242c and an unused portion 244c; and the VM 236d can include a used portion 242d and an unused portion 244d. The used portion 242a, 242b, 242c, 242d can be collectively referred to as used portions 242 and the unused portion 244a, 244b, 244c, 244d can be collectively referred to as unused portions 244.

In some examples, for each VM 236, the used portion 242 of the respective section of the SPA 234 for the VM 236 includes i) a portion of the respective section of the SPA 234 for the VM 236 that is being actively used and ii) a portion of the respective section of the SPA 234 that is allocated for future use. Simply, the memory management module 232 is able to additionally include a portion of the SPA 234 for future use by the VMs 236 (e.g., a "buffer"). For example, the memory management module 232 is able to determine a rate at which the usage of the SPA 234, and the memory modules 220, is increasing. For example, the VM 236a can be assigned 8 gigabytes (GB) of the SPA 234—that is, the first section 240a that is mapped to the VM 236a can include 8 GB of the SPA 234. However, only 5 GB of the first section 240a is used by the VM 236a—that is, the used portion 242a of the first section 240a is 5 GB of the SPA 234. Furthermore, the used portion 242a of the first section 240a can further include an additional "buffer" of memory space of first section 240a of the SPA 234. For example, a configurable parameter may be set to 1 GB of the SPA 234. Thus, the used portion 242a can include a portion that is being actively used—5 GB of data; and a portion for future use—1 GB of data. Thus, the used portion 242a of the first section 240a of the SPA 234 can be 6 GB. To that end, correspondingly, the unused portion 244a of the first section 240a of the SPA 234 can be 2 GB—i.e., the difference between the total size of the first section 240a (8 GB) and the used portion 242a (6 GB).

In some examples, for each VM 236, the portion of the respective section 240 of the SPA 234 that is allocated for future use is based on historical usage trend data for the VM 236. Specifically, the memory management module 232 can determine that a VM 236 is using, on average, a particular data mount (e.g., 5 GB) of the SPA 234 over a particular time period (e.g., one hour, one day, one week, one month, or one year). To that end, the configurable parameter for a particular VM 236 can be established based on the historical user trend data for the particular VM 236. For example, when the historical trend usage data indicates a usage by the particular VM 236 of the SPA 234 of 5 GB, the configurable parameter for the size of the portion 242 that is allocated for future use can be set at 1 GB. The configurable parameter can be user adjustable—e.g., an administrator of the computing environment 200.

In some examples, for each VM 236, the portion of the respective section 240 of the SPA 234 that is allocated for future use is based on a percentage of the portion of the respective section of the SPA 234 that is being actively used. Specifically, the memory management module 232 can determine that a VM 236 is using, on average, a particular data mount (e.g., 5 GB) of the SPA 234 over a particular time period (e.g., one hour, one day, one week, one month, or one year). To that end, the configurable parameter for a particular VM 236 can be established based on the percentage of the particular data amount. For example, when the used portion 242a of the first section 240a for the VM 236a is 5 GB, the size of the used portion 242a that is allocated for future use can set at a percentage of 5 GB—e.g., 10% or 20%.

In some examples, for each VM 236, the portion of the respective section 240 of the SPA 234 that is allocated for future use is a default value. For example, the size of the used portion 242a that is allocated for future use can set at 1 GB or 2 GB.

In some implementations, a physical failure of particular memory module 220 can be identified. In some examples, the failed memory module 220 can report such a failure, e.g., to the memory management module 232. In the illustrated example, the memory module 220c can have a physical failure. In some examples, multiple memory modules 220 can have a physical failure. In response to identifying the physical failure of the particular memory module 220, the memory management module 232 identifies a particular VM 236 that is assigned to the section of the SPA 234 that is associated with the particular memory module 220 that has physically failed. That is, the memory management module 232 identifies the section of the SPA 234 that has a "faulty address." In the illustrated example, the memory management module 232 identifies the section 240c as being mapped to the VM 236c—e.g., the "faulty" section. Furthermore, the memory management module 232 identifies the VM 236c that is assigned to the section 240c. That is, the memory management module 232 identifies the VM 236c that is assigned to the section 240c of the SPA 234 that is associated with the memory module 220c that has physically failed. In some examples, multiple VMs 236 can be assigned to the section of the SPA 234 that is associated with the particular memory module 220 that has physically failed.

In some examples, in response to identifying the particular VM 236 that is assigned to the section of the SPA 234 that is associated with the particular memory module 220 that has physically failed, the memory management module 232 can shut down the particular VM 236. For example, the VM 236c can be shut down (or disabled). In some examples, in response to identifying the physical failure of the particular memory module 220, a current operating condition of the remaining VMs 236 can be maintained. For example, the VMs 236a, 236b, 236d are maintained in a current operating condition.

In some implementations, the memory management module 232 can accumulate, for each other VM 236, the unused portions 244 of the respective SPA 234 for the VM 236. In the illustrated example, the memory management module 232 can accumulate the unused portions 244a, 244b, 244d of the SPA 234 that are assigned to the VMs 236a, 236b, 236d, respectively. The memory management module 232 can mark, for each other VM 236, the unused portions 244 of the SPA 234 for the VM 236 as read-only for the VM 236. For examples, the memory management module 232 can mark the unused portion 244a as read-only with respect to the VM 236a; the unused portion 244b as read-only with respect to the VM 236b; and the unused portion 244d as read-only with respect to the VM 236d. By marking the unused portions 244a, 244b, 244d as read-only with respect to VMs 236a, 236b, 236d, respectively, the VMs 236a, 236b, 236d do not attempt to access, write to, or use the unused portions 244a, 244b, 244d, respectively, or are unsuccessful in doing so. In some examples, the unused portions 244a, 244b, 244d can be marked as bad sectors with respect to VMS 236a, 236b, 236d, respectively.

In some implementations, the memory management module 232 can reassign at least portion of the unused portions 244 of the SPA 234 to the particular VM 236. For example, the memory management module 232 can reassign one or more of the unused portions 244a, 244b, 244d to the VM 236c. That is, the memory management module 232 can accumulate the unused portions 244a, 244b, 244d (e.g., the system physical addresses), and reassign one or more of the unused portions 244a, 244gb, 244d (or portions thereof) of the SPA 234 to the VM 236c.

In some examples, the particular VM 236 can be rebooted after reassigning the at least portion of the unused portions 244 of the SPA 234 to the particular VM 236. In the illustrated example, the memory management module 232 can reboot the VM 236c after reassigning a portion of the unused portions 244a, 244b, 244d of the SPA 234 to the VM 236c. The VMs 236a, 236b, 236d are not rebooted when the VM 236c is rebooted—the VMS 236a, 236b, 236d maintain the current operating condition thereof.

In some examples, the environment 200 can be shut down and brought back to an original state. That is, the memory module 220c that occurred a physical failure can be physically replaced with a different (or new) memory module that does have a physical failure. After the memory module 220c is replaced, the environment 200 can be rebooted such that it returns to the original state prior to the physical failure of the memory module 220c. That is, the VM 236a can be assigned to the first section 240a of the SPA 234; the VM 236b can be assigned to the second section 240b of the SPA 234; the VM 236c can be assigned to the third section 240c of the SPA 234; and the VM 236d can be assigned to the fourth section 240d of the SPA 234.

FIG. 3 illustrates a flowchart depicting selected elements of an embodiment of a method 300 for dynamic distribution of memory in an information handling system. The method 300 may be performed by the information handling system 100, the computing environment 200, and/or the memory management module 232 described herein with reference to FIGS. 1-2, or another information handling system. It is noted that certain operations described in method 300 may be optional or may be rearranged in different embodiments.

The memory management module 232 can identify the memory modules 220 (302). The memory management module 232 can create the SPA 234 of the memory modules 220 (304). The memory management module 232, a can assign, for each of the VMs 236, a respective section of the SPA 234 to the VM 236 (306). The memory management module 232 can calculate, for each VM 236, i) a portion of the respective section of the SPA 234 for the VM 236 that is being used by the VM 236; and ii) a portion of the respective section of the SPA 234 for VM 236 that is not being used by the VM 236 (308). A physical failure of particular memory module 220 can be identified (310). In some examples, the failed memory module 220 can report such a failure, e.g., to the memory management module 232. In response to identifying the physical failure of the particular memory module 220, the memory management module 232 identifies a particular VM 236 that is assigned to the section of the SPA 234 that is associated with the particular memory module 220 that has physically failed (312). The memory management module 232 can accumulate, for each other VM 236, the unused portions 244 of the respective SPA 234 for the VM 236 (314). The memory management module 232 can mark, for each other VM 236, the unused portions 244 of the SPA 234 for the VM 236 as read-only for the VM 236 (316). The memory management module 232 can reassigned at least portion of the unused portions 244 of the SPA 234 to the particular VM 236 (318).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for dynamic distribution of memory in an information handling system, the method comprising:

identifying a plurality of memory modules of the information handling system;

creating a system physical address (SPA) of the memory modules;

assigning, for each of a plurality of virtual machines (VMs), a respective section of the SPA to the VM;

calculating, for each VM, i) a portion of the respective section of the SPA for the VM that is being used by the VM to define used portions and ii) a portion of the respective section of the SPA for the VM that is not being used by the VM to define unused portions;

identifying a physical failure of a particular memory module of the plurality of memory modules;

in response to identifying the physical failure of the particular memory module:
  identifying a particular VM of the plurality of VMs assigned to the section of the SPA associated with the particular memory module that has physically failed;
  accumulating, for each other VM of the plurality of VMs, the unused portions of the respective SPA for the VM;
  marking, for each other VM of the plurality of VMs, the unused portion of the SPA for the VM as read-only for the VM; and
  reassigning at least a portion of the unused portions of the SPA to the particular VM.

2. The computer-implemented method of claim 1, further comprising rebooting the particular VM after reassigning the at least portion of the unused portion of the SPA to the particular VM.

3. The computer-implemented method of claim 1, wherein, for each VM, the used portion of the respective section of the SPA for the VM includes i) a portion of the respective section of the SPA for the VM that is being actively used and ii) a portion of the respective section of the SPA that is allocated for future use.

4. The computer-implemented method of claim 3, wherein, for each VM, the portion of the respective section of the SPA that is allocated for future use is based on historical usage trend data for the VM.

5. The computer-implemented method of claim 3, wherein, for each VM, the portion of the respective section of the SPA that is allocated for future use is based on a percentage of the portion of the respective section of the SPA for the VM that is being actively used.

6. The computer-implemented method of claim 1, wherein, in response to identifying the physical failure of the particular memory module, maintaining a current operating condition of each other VM of the plurality of VMs.

7. The computer-implemented method of claim 1, wherein the plurality of memory modules includes non-volatile dual in-line memory modules.

8. A system comprising a processor having access to memory media storing operations executable by the processor to:
  identifying a plurality of memory modules of an information handling system;
  creating a system physical address (SPA) of the memory modules;
  assigning, for each of a plurality of virtual machines (VMs), a respective section of the SPA to the VM;
  calculating, for each VM, i) a portion of the respective section of the SPA for the VM that is being used by the VM to define used portions and ii) a portion of the respective section of the SPA for the VM that is not being used by the VM to define unused portions;
  identifying a physical failure of a particular memory module of the plurality of memory modules;
  in response to identifying the physical failure of the particular memory module:
    identifying a particular VM of the plurality of VMs assigned to the section of the SPA associated with the particular memory module that has physically failed;
    accumulating, for each other VM of the plurality of VMs, the unused portions of the respective SPA for the VM;
    marking, for each other VM of the plurality of VMs, the unused portion of the SPA for the VM as read-only for the VM; and
    reassigning at least a portion of the unused portions of the SPA to the particular VM.

9. The system of claim 8, the operations further comprising rebooting the particular VM after reassigning the at least portion of the unused portion of the SPA to the particular VM.

10. The system of claim 8, wherein, for each VM, the used portion of the respective section of the SPA for the VM includes i) a portion of the respective section of the SPA for the VM that is being actively used and ii) a portion of the respective section of the SPA that is allocated for future use.

11. The system of claim 10, wherein, for each VM, the portion of the respective section of the SPA that is allocated for future use is based on historical usage trend data for the VM.

12. The system of claim 10, wherein, for each VM, the portion of the respective section of the SPA that is allocated for future use is based on a percentage of the portion of the respective section of the SPA for the VM that is being actively used.

13. The system of claim 8, wherein, in response to identifying the physical failure of the particular memory module, maintaining a current operating condition of each other VM of the plurality of VMs.

14. The system of claim 8, wherein the plurality of memory modules includes non-volatile dual in-line memory modules.

15. A non-transitory computer-readable medium storing software comprising instructions executable by one or more computers which, upon such execution, cause the one or more computers to perform operations comprising:
  identifying a plurality of memory modules of an information handling system;
  creating a system physical address (SPA) of the memory modules;
  assigning, for each of a plurality of virtual machines (VMs), a respective section of the SPA to the VM;
  calculating, for each VM, i) a portion of the respective section of the SPA for the VM that is being used by the VM to define used portions and ii) a portion of the respective section of the SPA for the VM that is not being used by the VM to define unused portions;
  identifying a physical failure of a particular memory module of the plurality of memory modules;
  in response to identifying the physical failure of the particular memory module:
    identifying a particular VM of the plurality of VMs assigned to the section of the SPA associated with the particular memory module that has physically failed;
    accumulating, for each other VM of the plurality of VMs, the unused portions of the respective SPA for the VM;
    marking, for each other VM of the plurality of VMs, the unused portion of the SPA for the VM as read-only for the VM; and
    reassigning at least a portion of the unused portions of the SPA to the particular VM.

16. The computer-readable medium of claim 15, the operations further comprising rebooting the particular VM after reassigning the at least portion of the unused portion of the SPA to the particular VM.

17. The computer-readable medium of claim 15, wherein, for each VM, the used portion of the respective section of the SPA for the VM includes i) a portion of the respective section of the SPA for the VM that is being actively used and ii) a portion of the respective section of the SPA that is allocated for future use.

18. The computer-readable medium of claim 17, wherein, for each VM, the portion of the respective section of the SPA that is allocated for future use is based on historical usage trend data for the VM.

19. The computer-readable medium of claim 17, wherein, for each VM, the portion of the respective section of the SPA that is allocated for future use is based on a percentage of the portion of the respective section of the SPA for the VM that is being actively used.

20. The computer-readable medium of claim 15, wherein, in response to identifying the physical failure of the particular memory module, maintaining a current operating condition of each other VM of the plurality of VMs.

* * * * *